United States Patent Office 3,275,468
Patented Sept. 27, 1966

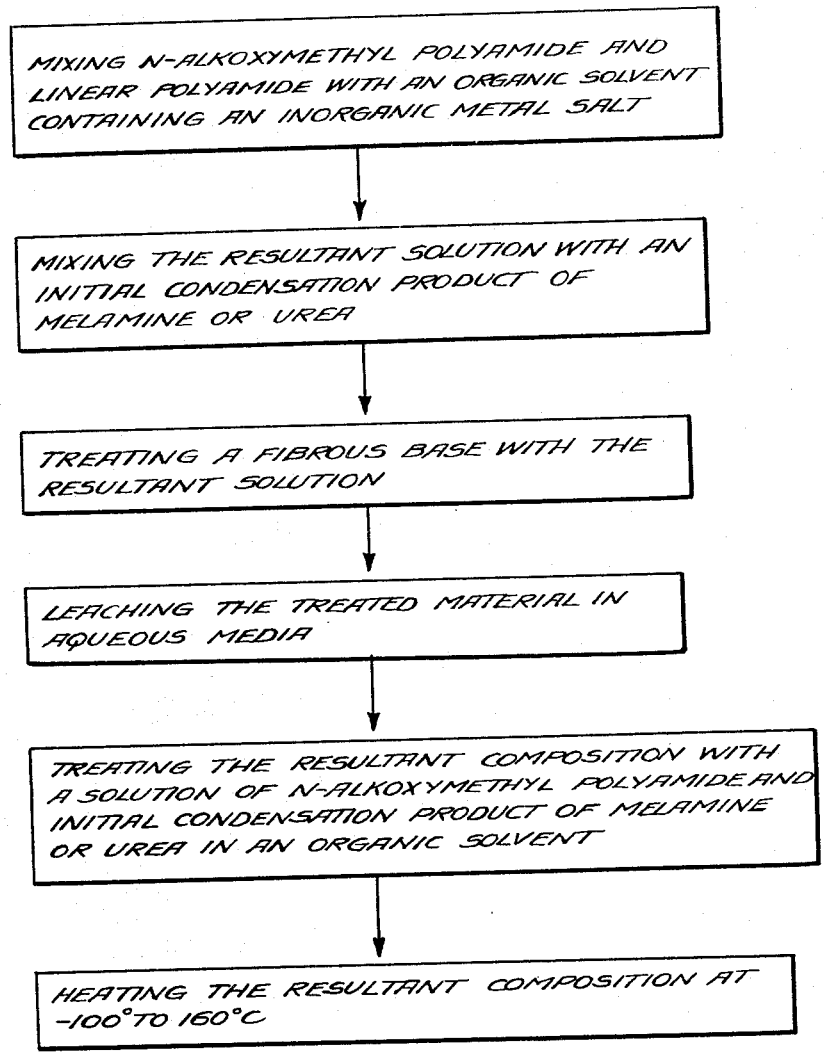

3,275,468
METHOD FOR THE PRODUCTION OF
ARTIFICIAL LEATHER
Tomoo Aoki, Sennan-gun, Japan, assignor to Toyo Cloth Company, Limited, Sennan-gun, Japan, and Toyo Rayon Company, Limited, Chuo-ku, Japan
Filed Sept. 4, 1962, Ser. No. 221,374
6 Claims. (Cl. 117—63)

This invention relates to the provision of artificial leather products which are markedly similar to natural leather. More particularly, the invention pertains to the method of preparing artificial leather products by treating fibrous bases with a mixture of N-alkoxymethyl polyamides and non-alkoxymethylated synthetic linear polyamides dissolved in solutions in alcohols of metal salts and leaching the resultant fibrous materials an aqueous media to dissolve off the metal salts. The products thus obtained have a pronounced similarity to natural leather in porosity, pliability, flexibility and other physical properties.

The method of providing porous products comprising dissolving linear polyamides in alcohol solutions of metal salts and removing the salts with non-solvents is described in U.S. Patents 2,359,877 and 2,359,878. Between the resultant products and natural leather, however, there is a striking difference in physical properties due to the employment of linear polyamides.

According to said patents, the linear polyamides employed are confined to the group of polyamides and polythioamides having no replaced groups or having alkyl groups at position N. These polyamides coagulate simultaneously with the separation of the metal salts, so that there is formed a structural disagreement between the rapidly hardened surface layers and slowly hardening inner layers of the product, resulting in hollow cavities, irregular porosity and uneven structure.

The principle of the present invention, on the other hand, comprises dissolving at least one species of N-alkoxymethyl polyamide having alkoxymethyl at position N, i.e. having the hydrogen atom of the amide group replaced with an alkoxymethyl group and at least one species of a non-alkoxymethylated synthetic linear polyamide in the alcohol or ethylene chlorohydrine solution of a metal salt, preferably in the solution of a metal salt in a lower aliphatic alcohol, so as to provide a solution substantially of 5 to 40 mol percent of alkoxymethylation applying the resultant solution to a fibrous base by coating or impregnating, and leaching the treated material in aqueous media to dissolve off the metal salt. The product thus obtained is of excelled qualities having a striking similarity to natural leather.

Irrespective of the presence or replacing groups, polyamides do not coagulate in solutions of metal salts in organic solvents, because the metal ions in the solution form complex ions with >CO and >NH of the amide chain. When the treated fibrous material, however, is leached in aqueous media, the metal salt dissolves out, allowing the polyamide coating to coagulate as a result of the hydrogen bond formed between the polyamide chains.

According to the principles of this invention, furthermore, the alkoxymethylation of the hydrogen atoms taking part in the formation of the hydrogen bond between the polyamide chains, reduces the hydrophobic property of the polyamide or N-alkyl polyamide used, so that the formation of the complex compound with the metal salt is stabilized and the coagulating process of the polyamide upon leaching is profitably controlled. The aforesaid disagreement between the layers of the composition is thus eliminated, producing for the first time in the art the most satisfactory composition of uniform hardening and porosity throughout the layers, rich pliability and other excelled physical properties.

The rapidity of the coagulating process depends partly upon the species of the metal salt employed. But the rapidity is mainly controlled by the degree of alkoxymethylation of the polyamide employed, and by the length of the chain of the alkoxymethyl group or the number of carbon atoms of the alkoxy group.

The N-alkoxymethyl polyamide employed in this invention is prepared by introducing an alkoxymethyl group into one of synthetic linear polyamides or polythioamides at position N. The alkoxymethylation is confined to 5 to 40 mol percent, preferably to 10 to 30 mol percent. The compound of less than 5 mol percent alkoxymethylation tends to excessively speed up the coagulating process of the polyamide, and the compound of more than 40 mol percent alkoxymethylation slows down excessively said coagulating process. The alkoxymethyl group employed is selected from the group having less than 12 carbon atoms in the alkoxy group, because the object of this invention cannot be obtained with those compounds having 13 or more carbon atoms.

The alcohols employed in the practice of this invention are lower aliphatic alcohols having less than 6 carbon atoms, preferably less than 4 carbon atoms, such as methanol, ethanol, isopropanol, butanol and the like, and unsaturated compounds such as allyl alcohols. Ethylene chlorohydrine can also be employed instead of or together with said solvent.

The metal salts employed in the invention are alcohol- and water-soluble but inert to N-alkoxymethyl polyamides. Said salts are further required to be provided with monovalent or bivalent metal ions and 0.3 to 0.8 ionizing potential in terms of Rydberg energy. The desired product of the invention cannot be obtained with those metal salts having Rydberg energy outside of said range. The best result is obtained with lithium chloride, calcium chloride, magnesium chloride, and zinc chloride.

The base materials employed in the invention are fabrics, papers, unwoven fabrics, loosely bound mats and the like fibrous materials made of synthetic fibers such as polyamide, polyacrylonitrile and copolymers thereof, polypropylene, polyethylene, polyvinylacetal, polyvinylchloride, polyvinylidene chloride, polyester, etc.; artificial fibers such as viscose rayon, cellulose acetate and the like; and nautral fibers such as cotton, silk, wool, etc.

In the invention, favorable results can be obtained with the metal salts which are dissolved in the solvent to the saturating point. But the most satisfactory results are profitably obtained in the order of 5 weight percent or more.

The N-alkoxymethyl polyamide and non-alkoxymethylated synthetic linear polyamide employed in the practice of the invention can be readily dissolved in the metal salt solution at a temperature slightly over room temperature. As to the viscosity, the most desirable composition can be obtained by coating the base material with a solution of 20,000 cp. or thereabout or by dipping the material in a solution of 100 to 500 cp.

Prior to the leaching in aqueous media which is performed preferably at room temperature, the treated material is profitably heated to dryness at 80° to 90° C. To facilitate the dissolution of the metal salt without injuring the properties of the coagulated coatings or layers, the leaching medium can be alkalized to a pH which is not strong enough to recompose the base material and the N-alkoxymethyl polyamide coagulated. A chelating agent such as ethylene diamine tetra acetic acid can also be dissolved in the leaching medium.

To improve the physical properties of the product obtained, the base material is preferably heated at 100° to 160° C. for 1 to 20 minutes, so as to react the alkoxymethyl group with the >NH remaining in the N-alkoxymethyl polyamide and/or with >NH of polyamide fibers or —OH of cellulose fibers to form a methylene linkage. This treatment is profitably performed when a potential catalizer, such as ammonium citrate or ammonium phosphate which turns acidic when heated, is added to the leaching medium prior to the leaching operation.

To further improve the physical properties of the leather product obtained, the initial condensation product of melamine or urea resins is dissolved in the N-alkoxymethyl polyamide-metal salt solution. Said resinous material condenses itself or react with the N-alkoxymethyl polyamide to form a leather composition of agreeable toughness, pronounced brightness and moderate physical properties.

The rapidity of the coagulating process of the N-alkoxymethyl polyamide varies with the species of said polyamides and metal salts employed and the degree of alkoxymethylation. But the process is accelerated without damaging the profitable properties of the product by dissolving a synthetic linear polyamide having no substituted group at position N in the metal salt solution together with N-alkoxymethyl polyamide.

Said polyamides having no replaced groups at position N are synthetic linear polyamides and copolymers thereof, having at least 2 carbon atoms in the segments of the chain separating the amide groups, e.g. nylon 6, nylon 6.6, nylon 6.10, polyester amide and the like which can be prepared by reacting diamine with dibasic acid, or by denaturing diamine-dibasic acid compounds with glycol, or by polymerizing monoaminocarboxylic acid. But the addition of said polyamide in the invention is substantially confined to 5 to 40 mol percent alkoxymethylation in terms of the polyamide chains present in the solution. For instance, to 10 parts of N-alkoxymethyl polyamide of 50 mol percent alkoxymethylation are added 2.5 to 90 parts of the polyamide having no replaced groups at position N, insofar as the amide chains are of the same length and structure.

The addition of said polyamides having no substituted groups at position N is profitable from the industrial viewpoint, particularly for those product wherein N-alkoxymethyl polyamide coagulates very slowly. The product thus obtained are also excelled in uniform porosity, pliability, softness and other physical properties, showing no substantial difference from the product where such additional treatment is not employed.

According to the principles of the invention, a variety of products ranging from kid-like product to cowhide-like product are obtained by modifying the chain length of the introduced alkoxymethyl group, the degree of alkoxymethylation, and interlinkage degree of the amide chains and the ratio of the non-replaced polyamide to be employed additionally in the metal salt solution with the N-alkoxymethyl polyamide. Particularly when loosely bound mats are treated by the methods of this invention, a collagen-like layer of pronounced porosity and pliability is obtained, showing marked improvements in tensible strength ultimate elongation, rubbing resistance and folding endurance as compared with the unwoven fabrics fixed with rubber latex.

In the present invention, it is also possible to provide a product with a desired color or to modify the property of the product by mixing a suitable dyestuff, pigment, plasticizer, stabilizer, electrification inhibitor and the like agents in the metal salt solution together with N-alkoxymehyl polyamide.

In Table 1 are shown the findings obtained as to the physical properties of the compositions prepared from (1) N-methoxymethyl polycapramide of 14 mol percent methoxymethylation, (2) an 8:2 by weight mixture of said N-methoxymethyl polycapramide of 28 mol percent methoxymethylation and non-replaced polycapramide, and (3) non-replaced polycapramide In preparing the film, the 1:1:2 by weight solution of polyamide, calcium chloride and methanol is spread uniformly with an applicator on a glass plate and dipped in aqueous media to dissolve off the metal salt. The resultant coating is removed from the plate and dried in the air, producing a film 0.15± 0.01 mm. thick. In Table 2 are shown the findings as to the films prepared by the addition of 30 parts of plasticizer. Throughout Tables 1 and 2, by "JIS" is means "Japanese Industrial Standard" measurements.

TABLE 1

|  | N-methoxymethyl polycapramide | N-methoxymethyl polycapramide: polycapramide (8:2) | Polycapramide (Nylon 6) | Remarks |
| --- | --- | --- | --- | --- |
| Thickness (mm.) | 0.15 | 0.15 | 0.15 | JIS-B-7509. |
| Tensile strength (kg./cm.$^2$) | 24 | 34 | 20 | ASTM-D882-54T. |
| Ultimate elongation (percent) | 150 | 100 | 25 | ASTM-D882 54T. |
| 100% modulus (kg./cm.$^2$) | 21 | 34 | 0 (broken) | ASTM-D882-54T. |
| Crease resistance (percent) | 36.7 | 27.0 | 22.5 | JIS-L-1004. |
| MIT folding resistance (at 20° C.) | 42,000 | 60,000 | 15,000 | JIS-P-8115. |
| Rubbing resistance [1] per kg | 3,500 | 1,100 | 950 | JIS-K-6772. |
| Moisture permeability (g./m.$^2$/24 hr.) | 1,860 | 1,620 | 1,570 | JIS-Z-0208. |
| Stiffness (Young's constant) (g./cm.$^2$) | 220 | 430 | 900 | Gurley's stiffness tester. |

[1] In terms of coated suede.

TABLE 2

|  | N-methoxymethyl polycapramide (14 mol percent methoxymethylation) | N-methoxymethyl polycapramide: polycapramide (8:2) | Polycapramide (Nylon 6) | Remarks |
| --- | --- | --- | --- | --- |
| Thickness (mm.) | 0.15 | 0.15 | 0.15 | JIS-B-7509 |
| Tensile strength (kg./cm.$^2$) | 12 | 27.3 | 22 | ASTM-D882-54T |
| Ultimate elongation (percent) | 175 | 125 | 60 | ASTM-D882-54T |
| 100% modulus (kg./cm.$^2$) | 9.5 | 25 | 0 (broken) | ASTM-D882-54T |
| Crease resistance (percent) | 62.5 | 55.0 | 50.0 | JIS-L-1004 |
| MIT folding resistance (at 25° C.) | 900,000 | 560,000 | 440,000 | JIS-P-8115 |
| MIT folding resistance (at −10° C.) | 320,000 | 62,000 | 45,000 | JIS-P-8115 |

It is also within the scope of this invention to further treat the resultant polyamide product with a finishing solution containing N-alkoxymethyl polyamide, linear copolyamide, polyester amide, oxyethyl polyamide or polyurethane or a mixture of said compounds in an organic solvent having a boiling point below 100° C., so as to improve the polyamide product of this invention in smoothness, dust-repellency, brightness of color, wear-resistance, pliability and other physical properties.

The finishing coating obtained is a transparent and smooth film. The amide or urethane linkage present in the finishing coating form a hydrogen bond with the amide linkage in the layers of the base composition, so that the finishing coating and the composition are firmly integrated or crosslinked to produce a finished product of much improved wear-resistance, rich pliability and other excelled physical properties.

A further improved effect is obtained when N-alkoxymethyl polyamide is employed as a main ingredient in the finishing solution and heated at 100° to 160° C. to cross link the alkoxymethyl group of the finishing coating with that of the base composition.

Initial condensation products of melamine or urea resins mixed in the finishing solution or in the original metal salt solution also produce more marked improvements in the physical properties of the composition, since the resin condenses itself or reacts with the polyamide molecules of the composition. Pigments, plasticizers, electrification inhibitors and the like agents can also be mixed in the finishing solution.

The accompanying drawing shows a flowsheet of an embodiment of the process according to the invention.

Preferred examples are as follows, wherein parts are by weight; dry content of resin used in Examples 1 to 7 is 160 g./m.² base and that for base and finishing coating in Examples 10 to 16 are respectively 160 g./m.² base and 20 g./m.² base; and the twilled cotton fabrics used are of 78 warfs (count 60/2s)/in. and 85 wefts (count 30/3s)/in.

*Example 1*

To a solution of 25 parts of calcium chloride

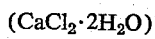

in 50 parts of methyl alcohol were added with heat 25 parts of N-methoxymethyl polycapramide of 14 mol percent methoxymethylation, 15 parts of benzene sulfonic acid methylamide as a plasticizer and 0.5 part of Lanasyn Yellow 3GL (a premetallized acid dye prepared by Sandoz, Switzerland). The resulting solution was applied 0.1 mm. thick to a twilled cotton fabric base, heated to dryness with hot air at 80° to 90° C. for 2 minutes, leached in water at 30° C. for 30 minutes, mangled and heated again with hot air at 80° to 90° C., producing an N-methoxymethyl polyamide product of a rich porosity, a pronounced softness and pliability and other markedly improved physical properties.

Similar results were obtained with 25 parts of N-methoxymethyl polythiocapramide of 14 mol percent methoxymethylation employed in the place of N-methoxymethyl polycapramide.

*Example 2*

To a solution of 10 parts of zinc chloride ($ZnCl_2 \cdot 2H_2O$) in 100 parts of ethylene chlorohydrine were added with heat 25 parts of N-methoxymethyl polycapramide of 20 mol percent methoxymethylation and 10 parts of ricinoleic acid isopropanolamide as a plasticizer. The resultant solution was applied 0.1 mm. thick to a twilled cotton fabric base, heated with hot air at 80° to 90° C. for 2 minutes, leached in water at 30° C. for 45 minutes, mangled and heated again with hot air at 80° to 90° C., yielding a nylon or an N-methoxymethyl polyamide product of a rich porosity and pliability and other markedly improved physical properties.

*Example 3*

To a solution of 25 parts of calcium chloride

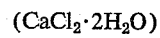

in 30 parts of methyl alcohol and 20 parts of ethyl alcohol were added with heat 15 parts of N-methoxymethyl polycapramide of 20 mol percent methoxymethylation, 10 parts of butoxymethyl polyhexamethylene sebacamide of 15 mol percent butoxymethylation, 5 parts of p-hydroxybenzene octalate as a plasticizer and 0.3 part of 2,6-ditertiarybutyl-4-methyl phenol as a stabilizer. The resultant solution was applied 0.1 mm. thick to a twilled cotton fabric base, dried with hot air at 80° to 90° C. for 2 minutes, leached in water at 30° C. for 60 minutes, mangled and dried with hot air at 80° to 90° C., producing a product of a rich porosity and pliability and other markedly improved physical properties.

*Example 4*

To a solution of 10 parts of lithium chloride in 45 parts of methyl alcohol and 5 parts of water were added with heat 20 parts of N-methoxymethyl polyhexamethylene sebacamide of 10 mol percent methoxymethylation, 12 parts of 2-ethylhexylhydroxyethyl phthalate as a plasticizer, 0.4 part of Lanasyn Brilliant Black A (an acid dye prepared by Sandoz, Switzerland). The resultant solution was applied 0.1 mm. thick to a twilled cotton fabric base, heated at 80° to 90° C. for 2 minutes, leached in water at 30° C. for 40 minutes, mangled and heated again at 80° to 90° C., producing a product rich in porosity and pliability and other physical properties markedly improved.

*Example 5*

To a solution of 30 parts of calcium chloride

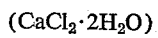

in 50 parts of methyl alcohol were added hot 30 parts of N-ethoxymethylene compound of 5 mol percent ethoxymethylation of the 1:1:1 copolymer of ε-caprolactam, hexamethylene sebacamide and hexamethylene adipamide. The resultant solution was applied 0.1 mm. thick to a twilled cotton fabric base, dried with hot air at 80° to 90° C. for 2 minutes, leached in water at 30° C. for 90 minutes, mangled and heated again for dryness at 80° to 90° C., yielding a product rich in porosity, pliability and other physical properties markedly improved.

*Example 6*

To a solution of 80 parts of zinc chloride ($ZnCl_2 \cdot 2H_2O$) in 50 parts of methyl alcohol and 50 parts of ethylene chlorohydrine were added with heat 30 parts of polycaprylamide, 10 parts of N-methoxymethyl polycaprylamide of 28 mol percent methoxymethylation and 20 parts of ricinoleic acid isopropanolamide as a plasticizer. The resultant solution was applied 0.1 mm. thick to a twilled cotton fabric base, dried at 80° to 90° C. for 2 minutes, bleached in water at 30° C. for 30 minutes, mangled and dried again with hot air at 80° to 90° C., yielding a product rich in porosity, pliability and other physical properties markedly improved.

*Example 7*

To a solution of 25 parts of calcium chloride

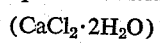

in 50 parts of methyl alcohol were added hot 10 parts of N-octoxymethyl polycaprylamide of 15 mol percent octoxymethylation, 5 parts of 1:1:1 copolymer of ε-caprolactam, hexamethylene sebacamide and hexamethylene adipamide, 10 parts of polycapramide, 15 parts of p-hydroxybenzene octalate as a plasticizer and 0.5 part of Lanasyn Brown GRL (a premetallized acid dye prepared by Sandoz). The resultant solution was applied 0.1 mm. thick to a twilled cotton fabric base, dried with hot air at 80° to 90° C. for 2 minutes, bleached in water at 30° C. for 80 minutes, mangled and dried again with hot air at 80° to 90° C., producing a product rich in porosity, pliability and other physical properties markedly improved.

*Example 8*

A mixture of 30 parts of polycaprylamide fibers (3 d., 25 mm.) and 70 parts of viscose fibers (6 d., 51 mm.) was shaped into a 130 to 150 g./m.² loosely bound mat. To a solution of 100 parts of calcium chloride ($CaCl_2 \cdot 2H_2O$) in 670 parts of methyl alcohol were added with heat 130 parts of N-methoxymethyl polyhexamethylene sebacamide of 14 mol percent methoxymethylation, 100 parts of 2-ethylhexylhydroxyethyl phthalate as a plasticizer and 2 parts of Lanasyn Brown GRL (a premetallized acid dye prepared by Sandoz). In the resultant solution was dipped the aforesaid mat held between a pair of 60-mesh wire nettings and mangled to 400 to 450% (dry content 140 g./100 g. loosely bound mat). The mat was then removed off the nettings, placed on an endless conveyer belt and dipped in water to form coagulated deposits of N-methoxymethyl polyhexamethylene sebacamide enclosing the fiber crossings. The resultant mat was then heated at 100° C. for 10 minutes, rolled at 80° C., and heated again at 120° to 140° C., yielding a product quite similar to natural leather in softness, pliability and other physical properties and having layers resembling the fibrous layers of collagen.

*Example 9*

A mixture of 40 parts of polyethylene terephthalate fibers (3 d., 38 mm.) and 60 parts of viscose fibers (10 d., 51 mm.) was shaped into a 100 to 150 g./m.² loosely bound mat. To a solution of 120 parts of zinc chloride ($ZnCl_2 \cdot 2H_2O$) in 600 parts of methanol and 70 parts of water were added with heat 50 parts of polyhexamethylene adipamide, 20 parts of 1:1 copolymer of caprylamide and hexamethylene adipamide, 60 parts of N-ethoxymethyl polycapramide of 10 mol percent ethoxymethylation, 130 parts of ricinoleic acid isopropanolamide as a plasticizer and 4 parts of Lanasyn Brilliant Black A (an acid dye prepared by Sandoz, Switzerland). In the resultant solution was dipped the aforesaid mat placed between 60-mesh wire nettings, and mangled to 400 to 450% (dry content 140 g./100 g. loosely bound mat). The mat was then removed off the nettings, placed on an endless conveyer belt and dipped in water to form coagulated polyamide deposits around the fiber crossings. The resultant mat was heated at 100° C. for 10 minutes, rolled at 80° C. and further treated with heat at 120° to 140° C., yielding a product quite similar to natural leather in softness, pliability and other physical properties and having layers resembling fibrous layers of collagen.

*Example 10*

To 80 parts of methanol were added with heat 20 parts of 1:1:1 copolymer of salt of di-(p-aminohexyl)-methane and adipic acid, ε-caprolactam and hexamethylene adipamide, 3 parts of ricinoleic acid 2-hydroxypropylamide, and 4 parts of 1:1 paint of ricinoleic acid 2-hydroxypropylamide and chrome yellow 5G. With the resultant solution was coated a porous composition prepared in Example 1 and dried with hot air at 70° C. for 3 minutes, yielding an article having a brilliant grain surface, a marked wear-resistance and other excelled physical properties.

*Example 11*

To 80 parts of methanol were added with heat 20 parts of N-methoxymethyl polycapramide of 28 mol percent methoxymethylation, 2 parts of mononoyl phenol as a plasticizer, 0.001 part of ammonium citrate, and 4 parts of 1:3 paint of ricinoleic acid isopropanolamide and carbon black. With the resultant solution was coated a porous composition prepared in Example 6 and heated with hot air at 130° C. for 15 minutes, yielding an article having a brilliant grain surface, a marked wear-resistance and other excelled physical properties.

*Example 12*

To 80 parts of methanol were added with heat 10 parts of 1:1:1 copolymer of ε-caprolactam, hexamethylene adipamide and hexamethylene sebacamide, 10 parts of N-methoxymethyl polyhexamethylene adipamide of 23 mol percent methoxymethylation, 5 parts of polyethylene adipate as a plasticizer and 0.5 part of Lanasyn Brown GRL (a premetallized acid dye prepared by Sandoz). With the resultant solution was cooled a porous composition prepared in Example 7 and heated with hot air at 70° C. for 3 minutes, yielding an article showing a brilliant grain surface, a marked wear-resistance and other pronounced physical properties.

*Example 13*

To a mixture of 40 parts of tetrahydrofuran and 40 parts of acetone were added 20 parts of urethane derived from polybutadiene adipate and 4,4′-diisocyanate diphenylmethane, and 1 part of Lanasyn Brilliant Black A (an acid dye prepared by Sandoz). With the resultant solution was coated a porous composition prepared in Example 2 and heated with hot air at 70° C. for 5 minutes, yielding an article showing a brilliant grain surface, a marked wear-resistance and other pronounced physical properties.

*Example 14*

To 80 parts of methanol were added 10 parts of N-methoxymethyl polycapramide, 10 parts of 1:1 copolymer of ε-caprolactam and hexamethylene adipamide, 0.001 part of ammonium citrate, 1 part of initial condensation product of trimethylol melamine and hexylene glycol, and 2 parts of 1:4 paint of trimethylol melamine-hexylene glycol initial condensation product and carbon black. With the resultant solution was coated a porous composition prepared in Example 3 and heated with hot air at 70° C. for 10 minutes, yielding an article having a brilliant grain surface, a rich wear-resistance and other marked physical properties.

*Example 15*

A mixture of 202 parts of sebacic acid and 61 parts of ethanolamine was heated in $N_2$ atmosphere at 150° to 170° C. for 5 hours and further heated at 260° C. under 1 mm. Hg for 2 hours. The resultant polymer was dissolved in 1:1 solution of ethanol and toluene to make a 20% polymer solution. With the resultant solution was coated a porous composition prepared in Example 5 and heated with hot air at 70° C. for 5 minutes, producing an article having a brilliant grain surface, a marked wear-resistance and other excelled physical properties.

*Example 16*

A 1:1 copolymer of capramide and hexamethylene sebacamide was reacted with a mixture of 2 mols of ethylene oxide and 1 mol of methanol. The resultant oxyethyl polyamide of 20 mol percent oxyethylation was dissolved in warm methanol to make a 20% polyamide solution. With the solution thus prepared was coated a porous composition obtained in Example 6 and heated with hot air at 70° C. for 5 minutes, yielding an article having a rich grain surface, a marked wear-resistance and other pronounced physical properties.

What I claim is:

1. Method of preparing artificial leather comprising mixing at least one species of N-alkoxymethyl polyamides and one species of synthetic linear polyamides with a solution in a solvent of an inorganic metal salt selected from the group consisting of lithium chloride, calcium chloride, magnesium chloride and zinc chloride to form a solution substantially of 5 to 40 mol percent alkoxymethylation, said N-alkoxymethyl polyamide being prepared by alkoxymethylating a member selected from the group consisting of synthetic linear polyamides and polythioamides with an alkoxymethyl group having less than 12 carbon atoms in the alkoxy group, said solvent being selected from the group consisting of aliphatic alcohols having less than 6 carbon atoms and ethylene chlorohydrine, treating a fibrous base with the resultant solution, and leaching in aqueous media the treated material to dissolve off the metal salt.

2. Method of preparing artificial leather as set forth in claim 1, wherein the final product is further treated with heat at a temperature ranging from 100° to 160° C.

3. Method of preparing leather compositions as set forth in claim 1, wherein the final product is further treated with a finishing solution of N-alkoxymethyl polyamide in a solvent selected from the group consisting of aliphatic alcohols having less than 6 carbon atoms and ethylene chlorohydrine, said N-alkoxymethyl polyamide being prepared by alkoxymethylating to 5 to 40 mol percent a synthetic linear polyamide with an N-alkoxymethyl group having less than 12 carbon atoms in the alkoxy group, and then treated with heat at a temperature ranging from 100° to 160° C.

4. Method of preparing artificial leather as set forth in claim 3, wherein the finishing solution is further mixed with a species selected from the group consisting of an initial condensation product of melamine and an initial condensation product of urea.

5. Method of preparing artificial leather, comprising mixing at least one species of N-alkoxymethyl polyamides and one species of synthetic linear polyamides with a solution in a solvent being selected from the group consisting of aliphatic alcohols having less than 6 carbon atoms and ethylene chlorohydrine of an inorganic metal salt selected from the group consisting of lithium chloride, calcium chloride, magnesium chloride and zinc chloride to form a solution substantially of 5 to 40 mol percent alkoxymethylation, said N-alkoxymethyl polyamide being prepared by alkoxymethylating a member selected from the group consisting of synthetic linear polyamides and polythioamides with an N-alkoxymethyl group having less than 12 carbon atoms in the alkoxy groups; further mixing with the resultant solution one species selected from the group consisting of an initial condensation product of melamine and an initial condensation product of urea resins, treating a fibrous base with the resultant solution, leaching the treated material in aqueous media to dissolve off the metal salt, and then treating the resultant material with heat at a temperature ranging from 100° to 160° C.

6. Method of preparing artificial leather, comprising mixing at least one species of N-alkoxymethyl polyamides and one species of synthetic linear polyamides with a solution in a solvent being selected from the group consisting of aliphatic alcohols having less than 6 carbon atoms and ethylene chlorohydrine and an inorganic metal salt selected from the group consisting of lithium chloride, calcium chloride, magnesium chloride and zinc chloride to form a solution substantially of 5 to 40 mol percent alkoxymethylation, said N-alkoxymethyl polyamide being prepared by alkoxymethylating a member selected from the group consisting of synthetic linear polyamides and polythioamides with an N-alkoxymethyl group having less than 12 carbon atoms in the alkoxy group, further mixing with the resultant solution one species selected from the group consisting of an initial condensation product of melamine and an initial condensation product of urea resins, treating a fibrous base with the resultant solution, leaching the treated material in aqueous media to dissolve off the metal salt, further treating the resultant composition with a solution of N-alkoxymethyl polyamide and a species selected from the group consisting of an initial condensation product of melamine and an initial condensation product of urea in a solvent selected from the group consisting of aliphatic alcohols having less than 6 carbon atoms and ethylene chlorohydrine, said N-alkoxymethyl polyamide being prepared by alkoxymethylating to 5 to 40 mol percent a synthetic linear polyamide with an N-alkoxymethyl group having less than 12 carbon atoms in the alkoxy group, and then treating the resultant composition with heat at a temperature ranging from 100° to 160° C.

References Cited by the Examiner
UNITED STATES PATENTS

| | | | |
|---|---|---|---|
| 2,359,877 | 10/1944 | Schupp | 260—33.4 |
| 2,359,878 | 10/1944 | Schupp | 260—33.4 |
| 2,430,860 | 11/1947 | Cairns. | |
| 2,443,450 | 6/1948 | Graham et al. | 117—161 |
| 2,593,207 | 4/1952 | Silver | 117—161 X |
| 2,644,773 | 7/1953 | Hammer et al. | 117—161 X |
| 2,689,239 | 9/1954 | Melamed | 117—138.8 X |

WILLIAM D. MARTIN, *Primary Examiner.*

T. G. DAVIS, *Assistant Examiner.*